No. 696,183. Patented Mar. 25, 1902.
J. W. McAULIFFE.
GASKET.
(Application filed Aug. 8, 1901.)
(No Model.)

WITNESSES:
Chas. H. Luther Jr
Ada E. Hagerty.

INVENTOR:
John W. McAuliffe
by Joseph A. Miller & Co
ATTORNEYS.

UNITED STATES PATENT OFFICE.

JOHN W. McAULIFFE, OF PROVIDENCE, RHODE ISLAND.

GASKET.

SPECIFICATION forming part of Letters Patent No. 696,183, dated March 25, 1902.

Application filed August 8, 1901. Serial No. 71,308. (No model.)

*To all whom it may concern:*

Be it known that I, JOHN W. MCAULIFFE, a citizen of the United States, residing at Providence, in the county of Providence and State of Rhode Island, have invented a new and useful Improvement in Gaskets, of which the following is a specification.

This invention has reference to a gasket for the joint between the base of a water-closet, the floor, and the soil-pipe; and it consists in the peculiar and novel construction of the gasket more fully set forth hereinafter.

The joint between the base of the usually ceramic water-closet and the soil-pipe is among all the joints required in sanitary plumbing the most important and the most difficult to make. This joint has heretofore been usually made with putty. It required much time, care, and skill to make a good putty joint, and when made the joint was liable to crack by the trying of the putty caused by the absorption of the oil by the floor, whether of marble, cement, or wood. The absorption of the oil also discolored the floor and was very objectionable.

The object of this invention is to facilitate the setting of the water-closet and the securing of a perfectly-tight permanent joint.

Figure 1:
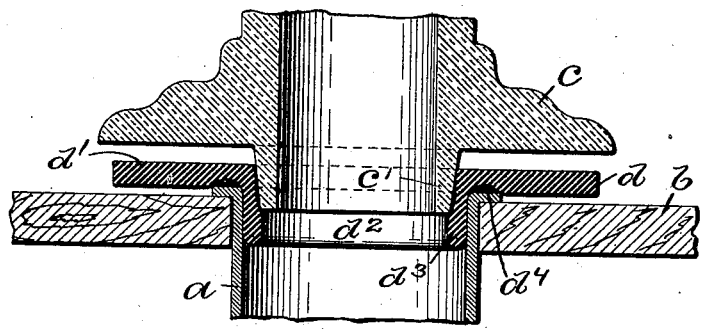
Figure 2:
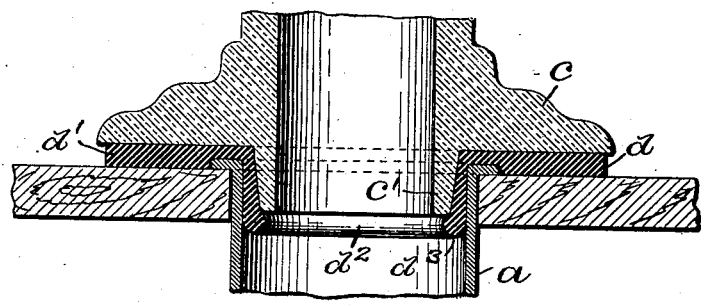
Figure 3:
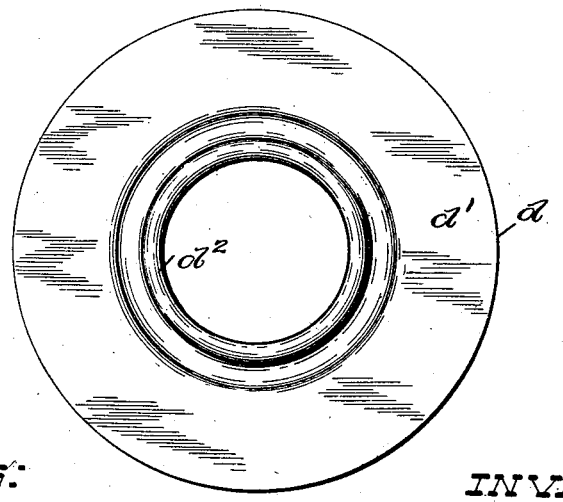

Figure 1 is a sectional view of the base of a water-closet, the floor, the soil-pipe, and my improved gasket shown in the position occupied by them when the closet is being put in place. Fig. 2 is a sectional view of the same parts as shown in Fig. 1, showing the base of the water-closet in place. Fig. 3 is a plan view of the gasket.

In the drawings, $a$ indicates the soil-pipe, which is usually flanged and rests on the floor $b$. In most cases the floor is marble, cement, or mosaic. The base $c$ of the water-closet forms a wide annular flange surrounding the projecting nipple extension $c'$. The gasket $d$ is formed in part or wholly of rubber, and consists, in the preferred form, of the annular flange $d'$ of practically uniform thickness, from which extends the cylindrical collar $d^2$, the lower portion $d^3$ of which is of greater thickness than the portion of the collar adjoining the annular flange $d'$. An annular depression $d^4$ is formed on the under side of the annular flange $d'$, close to the collar $d^2$, as is shown in Fig. 1.

When the base of the water-closet is in place and is secured, usually by bolts, to the floor, the material of the gasket yields in the direction of least resistance and completely fills the spaces between the base of the water-closet, the floor, and the soil-pipe, as is clearly shown in Fig. 2. The annular depression $d^4$ and the proportions of the material in the collar $d^2$ materially facilitate the even distribution of the material of the gasket, forming a perfectly-tight joint between the nipple $c'$ and the soil-pipe and a tight joint between the flange of the base and the floor.

As the gasket contains no free oil the base of the closet and the floor are not stained with oil. The yielding material of the gasket secures an even uniform bearing for the closet.

Having thus described my invention, I claim as new and desire to secure by Letters Patent—

In a gasket, the combination with the annular flange $d'$, and the cylindrical collar $d^2$, of the annular depression $d^4$, and the enlargement $d^3$ on the collar, as described.

In testimony whereof I have signed my name to this specification in the presence of two subscribing witnesses.

JOHN W. McAULIFFE.

Witnesses:
ADA E. HAGERTY,
JOSEPH A. MILLER.